Jan. 11, 1966   W. G. CROOKER ET AL   3,228,459
COMBINATION COOLING AND SEALED GAS COMBUSTION HEATING UNIT
Filed June 12, 1964   3 Sheets-Sheet 1

INVENTORS
JAMES O. FICHTNER
WILLIAM G. CROOKER
BY Daniel A Bobis

DANIEL H. BOBIS
ATTORNEY

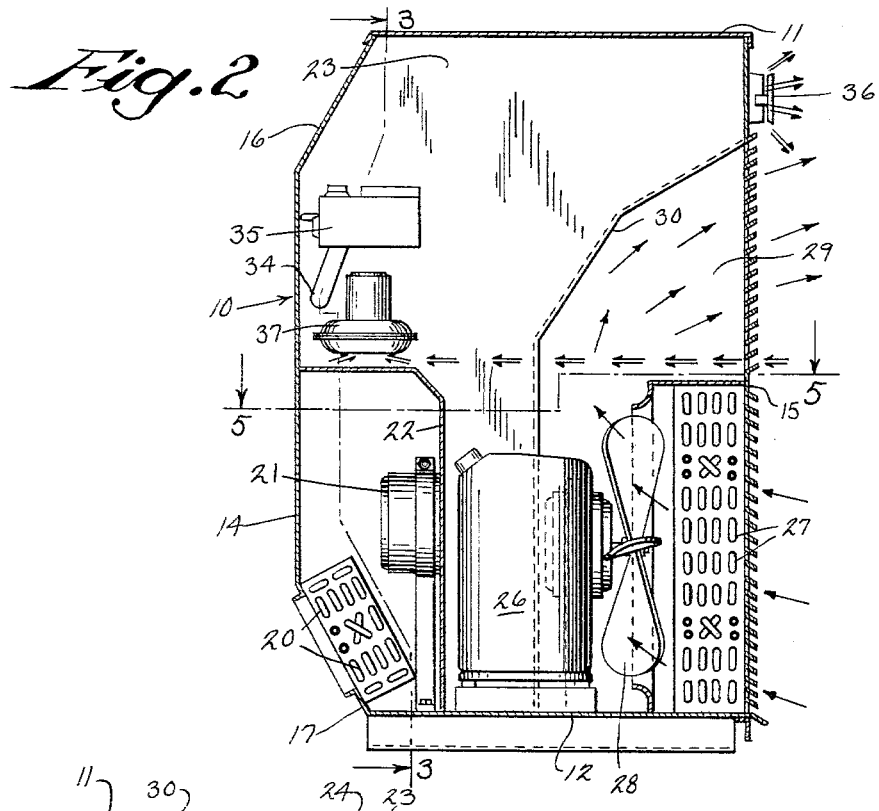
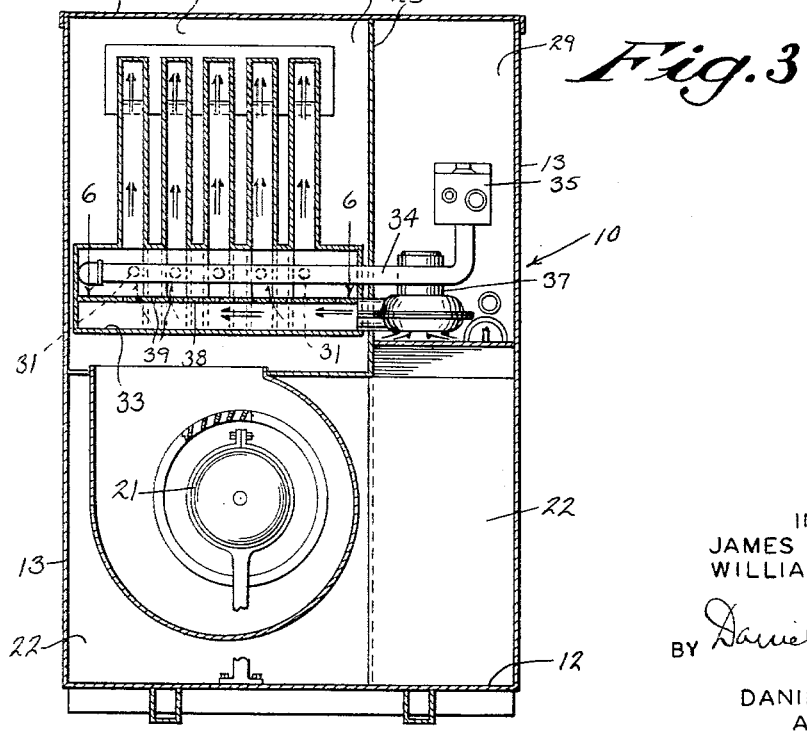

Jan. 11, 1966 W. G. CROOKER ET AL 3,228,459
COMBINATION COOLING AND SEALED GAS COMBUSTION HEATING UNIT
Filed June 12, 1964 3 Sheets-Sheet 3

INVENTORS
JAMES O. FICHTNER
WILLIAM G. CROOKER

BY Daniel A. Bobis

DANIEL H. BOBIS
ATTORNEY

United States Patent Office 3,228,459
Patented Jan. 11, 1966

3,228,459
COMBINATION COOLING AND SEALED GAS
COMBUSTION HEATING UNIT
William G. Crooker, Waukesha, and James O. Fichtner, Greendale, Wis., assignors to Worthington Corporation, Harrison, N.J., a corporation of Delaware
Filed June 12, 1964, Ser. No. 374,625
1 Claim. (Cl. 165—48)

This invention relates to improvements in air conditioning units, and more particularly to a single packaged heating and cooling air conditioner for selectively heating or cooling an enclosed area within an apartment or other building space.

A primary object of the invention is to provide a compact combination heating and cooling unit wherein the heater is a gas burner and air required for combustion is drawn from the outdoors and returned directly to the outdoors, providing a "sealed combustion" system wherein no indoor air is required to support the gas burner flame, eliminating any possibility of the discharge or seepage of dirty air or poisonous gases of combustion into the area to be serviced by the air conditioner.

A further object of the invention is to provide a unitary combination heating and cooling unit wherein the passageways for the air taken into the unit for cooling are completely separate from the passageways for the air brought in from the outside to support combustion at the gas burner unit.

A further object of the invention is to provide, in a combination heating and cooling unit of the character described, power blower means for drawing in and pressurizing outside air for the heating unit.

A further object of the invention is to provide an air conditioning unit of the character described which is very compact and fits flush with the exterior wall of the building in which it is installed, drawing in air and blowing out flue gases through a proper diffuser to the outside, thereby eliminating need for a chimney.

A more specific object of the invention is to provide an air conditioning unit for both heating and cooling of such a character that the operation of the unit can be easily changed over from summer cooling to winter heating and in which the unit, as incidents of the above operation, discharges into the room air which is filtered, humidified, cleaned and temperature conditioned.

A further object of the invention is to provide an all-year combination air conditioning unit which is very compact, which is easy to install in a building wall, which is automatic and efficient in its operation, and which is well adapted for the purposes described.

With the above and other objects in view, the invention consists of the improved air conditioning unit and its parts and combinations, as set forth in the claim, and all equivalents thereof.

In the accompanying drawings, in which the same reference characters indicate the same parts in all of the views:

FIG. 2 is a vertical sectional view of the unit taken approximately along the line 2—2 of FIG. 1;

FIG. 3 is a vertical sectional view taken along the line 3—3 of FIG. 2;

FIG. 4 is a vertical sectional view reversed relative to FIG. 2 and taken approximately along the line 4—4 of FIG. 5;

Figure 1:
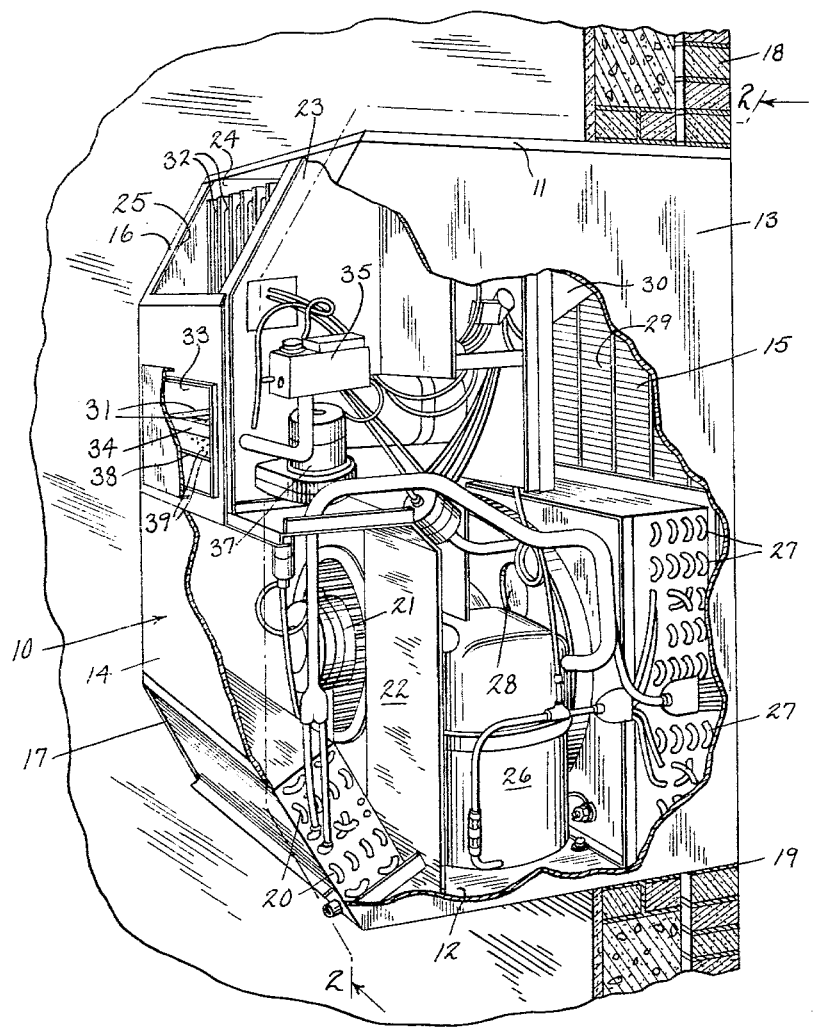
FIG. 1 is a front and side perspective view of the improved air conditioning unit with portions of the housing wall broken away and in section to show interior components, the view also showing the manner in which the unit is installed within an exterior wall opening of a building.
Figure 1:
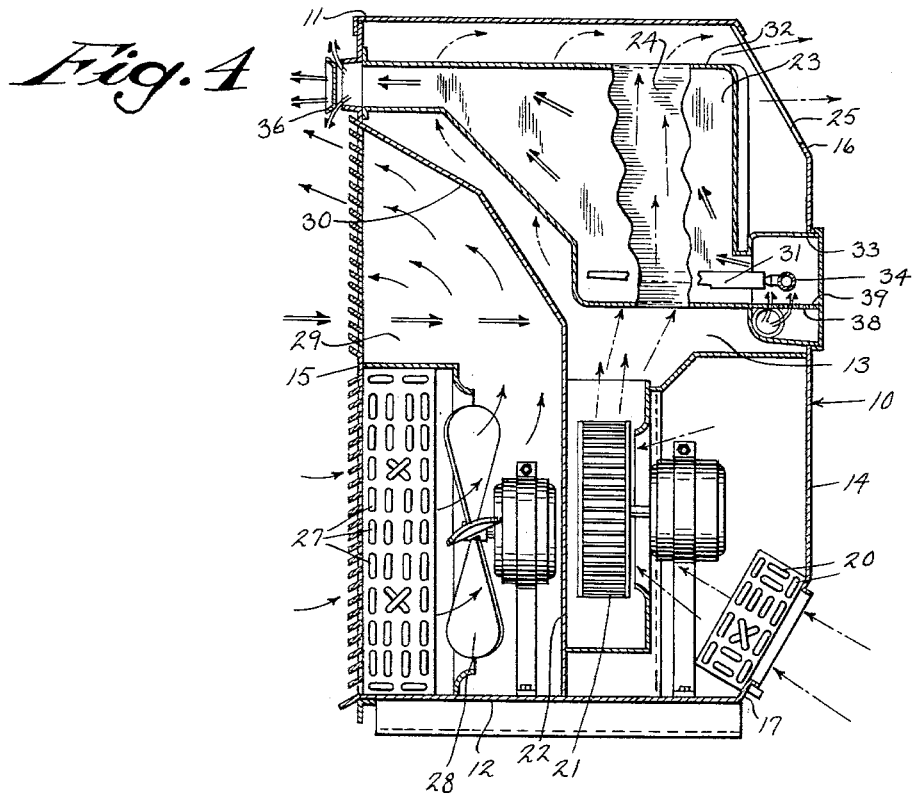
Figure 5:
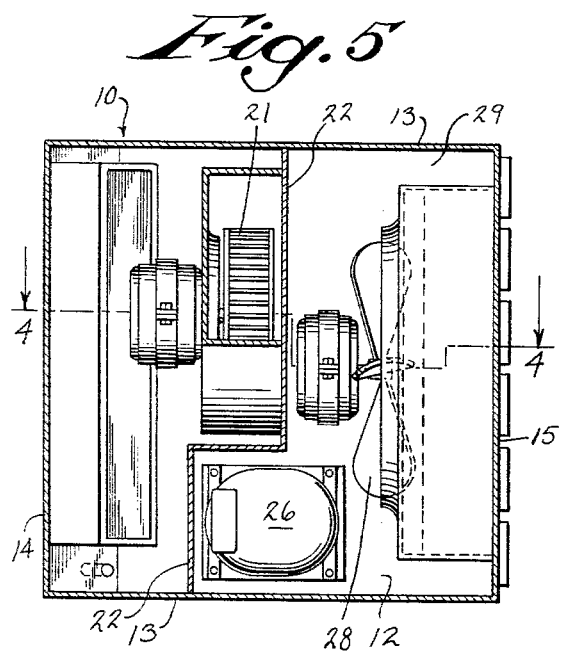
FIG. 5 is a horizontal sectional view taken along line 5—5 of FIG. 2.
Figure 6:
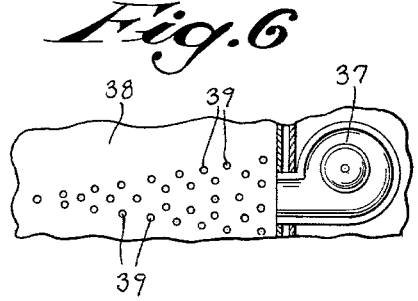
FIG. 6 is a horizontal sectional view taken approximately along line 6—6 of FIG. 3 and showing the air distribution plate for the air-gas mixing chamber.

Referring now more particularly to the drawings, it will appear that the air heating apparatus, the air cooling apparatus, and the ducts and compartments to control and confine gas flow are all assembled within a sheet metal, generally rectangular housing or casing, designated generally by the numeral 10. This housing includes imperforate top and bottom walls 11 and 12, imperforate side walls 13, a front or inner face wall 14, and a louvered rear or outside wall 15. The front or inner vertical wall 14 has its upper and lower portions beveled as at 16 and 17, as best shown in FIGS. 1, 2 and 4. When the unitary casing 10 which houses both the heating and the cooling apparatuses is installed within a building room, it is intended that it be mounted substantially in the manner shown in FIG. 1 wherein the numeral 18 designates an exterior wall of the building, and this exterior wall is provided with a vertically extending opening 19 which is coextensive in height and width with the height and width of the housing 10 whereby the housing 10 fits into said wall opening 19 with the rear or outside wall 15 of the housing being preferably flush with the outer surface of the structure wall 18.

The air cooling apparatus, all contained within the housing 10, includes conventional cooling coils 20 positioned immediately interiorly of the beveled inner end wall portion 17 of the housing, said portion 17 of the housing being open to permit the entrance of room or return air which is drawn in by the operation of an evaporator blower 21. As will best appear from FIGS. 2, 3 and 4, a stepped transverse partition 22 within the housing, and cooperating partitions 23 define an upper air chamber 24 from which, during the cooling operation, the cooled air is discharged into the room through an opening 25 in the face of the upper beveled inner end wall portion 16. The path of the air drawn in from the room and cooled by the coils 20 and passed into the chamber 24, from whence it is discharged into the room, is shown by broken line arrows in FIG. 4. It should be emphasized that this cooled air, which is discharged into the room, is maintained separated within the housing 10 from outside air, as will hereinafter appear. The air cooling apparatus also includes a compressor 26, condenser coils 27 located adjacent the foraminous lower portion of the outside end wall 15 of the housing, and a condenser fan 28. As is conventional there are tubular connections for the coils and condenser, together with electrical connections and controls for the blower and fan (not shown). The condenser fan 28 draws in air from the outside through the foraminous lower portion of the housing wall 15, which air passes over and around the condenser coils, extracting heat therefrom, and this air is then directly discharged to the outside through the upper foraminous portion of the outside end wall 15. The path of travel of said outdoor air is illustrated by the full line arrows in FIGS. 2 and 4 and it will appear that said outside air is confined to a chamber 29 defined by an inner transverse, angled partition 30, partition 23 and adjacent wall portions of the housing, and cannot commingle with the inside or return air, as per the showings in FIGS. 2 and 4.

The heating apparatus includes a plurality of laterally spaced apart gas burners 31 (see FIGS. 1, 3 and 4), each of which is enclosed by an upstanding metallic heat transfer hollow section 32, all of which extend upwardly relative to and communicate at their lower ends with an air-gas mixing chamber 33 housing a gas supply pipe 34 through which the flow of gas is controlled by a gas valve 35.

The air to support combustion is drawn into the upper portion of the foraminous outside end wall forwardly (relative to FIG. 2) of the partition 30 between a wall of the enclosed chamber 24 and wall portions of the housing 10 shown in FIG. 2, and follows the path shown by the split arrowheads in FIGS. 2, 3 and 4 and combines with the ignited gas issuing from the burners 31 so that this air-gas mixture and the products of combustion are confined within the burner-enclosing hollow sections 32 which at their upper outer ends communicate with a vent diffuser 36 in the upper portion of the outside foraminous wall 15 to thus discharge to the outside atmosphere. Said gases of combustion are maintained separate from the air to be heated which follows the course of the broken line arrows in FIGS. 3 and 4. The air to support combustion is drawn into the passageways above mentioned by a combustion air blower 37 which discharges into the air-gas mixing chamber 33.

Within the air-gas mixing chamber 33 there is a horizontally disposed air distribution plate 38, with a plurality of perforations 39 therein arranged in triangular formation. As the discharge end of the combustion blower 37 communicates with the interior of the air-gas mixing chamber 33, the perforated plate arrangement described functions to diffuse and evenly distribute the air which is directed to the gas burners 31 for supporting combustion and said gases of combustion are confined, as previously described, in a "sealed combustion" system, requiring no indoor air to support the gas burner flames.

The air which is discharged into the room or area to be air conditioned (either heated or cooled) is, of course, maintained in chambers and duct work separate from outside air and gases of combustion. Within this portion of the system there may be included conventional filters, humidifiers and cleaners (not shown). Also, as is conventional in air conditioning apparatus, the motor-operated blowers and fans have associated therewith thermostatically controlled switches.

When the thermostat (not shown) calls for heating, the heating apparatus commences its automatic cycle. The blower 37, functioning to draw in outdoor air to support combustion, is started, and this outside air is introduced by the blower into the air-gas mixing chamber 33. Also, proper timing for the room area's blower 21, used to circulate air in the room, is automatically activated. Devices conventional in the art start the gas burner's flames, and at a predetermined time the air circulating blower will both commence and ultimately stop its operation. The air used to support the gas burner flames is, of course, drawn directly from and exhausted directly to the outdoors, and during the course of its travel it is confined and prevented from commingling with the heated air which goes into the room.

When the thermostat calls for cooling, the air circulating blower 21 functions automatically to move the large volumes of air needed, and the refrigeration cycle is begun. Of course, during the cooling cycle the gas burners will not be in operation, nor will the blower 37 which pulls air from the outside to support combustion.

The improved single packaged heating and cooling unit is very compact, and the passageways for air taken into the unit for discharge into the room to condition the air therein are completely separate from the passageways for the air brought in from the outside to support combustion. There is no possibility of the discharge or seepage of dirty or poisonous gases of combustion into the room area served by the air conditioner.

The improved air conditioning unit, besides providing for selective heating and cooling is easy to install in a building wall, provides for the ready accessibility of the interior components, is neat and attractive in appearance, and is well adapted for the purposes described.

What is claimed as the invention is:

In an air conditioning unit mounted in an opening therefor in the outside wall of a building and including a housing having an inside wall and an outside wall, the inside wall of said housing having vertically spaced-apart intake and exhaust openings therein, partitions and walls within the housing forming a first closed passageway between the intake and exhaust openings in said inside wall of said housing for re-circulated air, a blower for drawing air into said intake opening and moving it through said first passageway, selectively operable air cooling coils within said first closed passageway adjacent said intake opening and in the path of air flowing through said passageway, said outside wall of the housing having spaced-apart gas intake and exhaust openings therein, additional partitions and walls within said housing forming a second closed passageway between said gas intake and exhaust openings in the outside wall of the housing, a selectively operable fuel burning heater within said second closed passageway adjacent said exhaust opening in the inside wall of the housing, and in the path of air flowing through said first closed passageway for heat transfer purposes, said second closed passageway maintaining the gases in said second passageway sealed relative to the air moving through said first passageway for discharge of said gases through the exhaust opening in said outside wall of the housing, and a blower for forcefully moving gases through said second passageway, said first closed passageway providing a common path of travel for either cooled or heated air.

References Cited by the Examiner
UNITED STATES PATENTS

| | | | |
|---|---|---|---|
| 2,216,175 | 10/1940 | Helbing | 165—48 X |
| 2,221,842 | 11/1940 | Miller | 165—64 X |
| 2,268,540 | 1/1942 | Andrews | 165—60 X |
| 2,524,160 | 10/1950 | Caduff | 165—60 X |
| 2,617,632 | 11/1952 | Simpson | 165—25 |
| 2,699,922 | 1/1955 | Herbst | 165—25 |
| 2,739,794 | 3/1956 | Graham | 165—59 |
| 2,773,676 | 12/1956 | Boyle et al. | 165—59 |
| 2,835,476 | 5/1958 | Kohut | 165—27 X |
| 2,880,718 | 4/1959 | Ryder | 165—110 X |
| 2,886,955 | 5/1959 | Bauman | 165—63 X |

ROBERT A. O'LEARY, *Primary Examiner.*

M. A. ANTONAKAS, *Assistant Examiner.*